(12) United States Patent
Zhang

(10) Patent No.: US 9,885,810 B2
(45) Date of Patent: Feb. 6, 2018

(54) OPTICAL ASSEMBLY AND MANUFACTURING METHOD THEREOF, AND POLARIZER

(71) Applicants: BOE TECHNOLOGY GROUP CO., LTD., Beijing (CN); BEIJING BOE DISPLAY TECHNOLOGY CO., LTD., Beijing (CN)

(72) Inventor: Hongshu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/151,273

(22) Filed: May 10, 2016

(65) Prior Publication Data

US 2016/0341853 A1    Nov. 24, 2016

(30) Foreign Application Priority Data

May 19, 2015    (CN) .......................... 2015 1 0254982

(51) Int. Cl.
*G02B 5/02*    (2006.01)
*G02B 1/14*    (2015.01)
(Continued)

(52) U.S. Cl.
CPC .............. *G02B 5/0247* (2013.01); *G02B 1/14* (2015.01); *G02B 5/003* (2013.01); *G02B 5/02* (2013.01);
(Continued)

(58) Field of Classification Search
CPC ...... G02B 5/02; G02B 5/0236; G02B 5/0247; G02B 1/14; G02B 5/003; G02B 5/0268; G02B 5/0278; G02B 5/3033
(Continued)

(56) References Cited

U.S. PATENT DOCUMENTS 8,408,775 B1 *    4/2013    Coleman ................... F21V 7/04
                                                              362/602
2003/0048400 A1    3/2003    Kim et al.
(Continued)

FOREIGN PATENT DOCUMENTS

CN          1407382 A       4/2003
CN          1987592 A       6/2007
(Continued)

OTHER PUBLICATIONS

First Office Action regarding Chinese Application No. 201510254982.1, dated Apr. 21, 2017. Translation provided by Dragon Intellectual Property Law Firm.

*Primary Examiner* — William R Alexander
(74) *Attorney, Agent, or Firm* — Harness, Dickey & Pierce, P.L.C.

(57) ABSTRACT

Disclosed are an optical assembly and a manufacturing method thereof, and a polarizer. The optical assembly includes: a first film layer; a second film layer disposed opposite to the first film layer; and multiple light absorption patterns disposed on the first film layer. The first film layer and the second film layer are light transmissive film layers, holes are disposed in the second film layer at locations corresponding to the light absorption patterns, and a dimension of an end of each hole away from the light absorption pattern is smaller than a dimension of an end of the hole close to the light absorption pattern. The optical assembly further includes light transmissive protrusions protruding into the holes.

18 Claims, 3 Drawing Sheets

(51) Int. Cl.
 *G02B 5/30* (2006.01)
 *G02B 5/00* (2006.01)
(52) U.S. Cl.
 CPC ......... *G02B 5/0236* (2013.01); *G02B 5/0268* (2013.01); *G02B 5/0278* (2013.01); *G02B 5/3033* (2013.01)
(58) Field of Classification Search
 USPC ....................................................... 359/599
 See application file for complete search history.

(56) References Cited

U.S. PATENT DOCUMENTS

| | | | | |
|---|---|---|---|---|
| 2006/0286663 | A1* | 12/2006 | Cunningham | B01L 3/5085 435/287.2 |
| 2007/0146271 | A1 | 6/2007 | Park | |
| 2008/0143894 | A1* | 6/2008 | Oohira | G02F 1/13363 349/12 |
| 2009/0272191 | A1* | 11/2009 | Maris | A61B 5/0097 73/618 |
| 2010/0085642 | A1* | 4/2010 | Drinkwater | F21V 33/006 359/567 |
| 2012/0075557 | A1* | 3/2012 | Hong | G02F 1/133524 349/96 |
| 2015/0109677 | A1* | 4/2015 | Jurik | G02B 19/0047 359/622 |
| 2015/0331276 | A1* | 11/2015 | Katsuta | G02F 1/133504 349/61 |
| 2015/0368525 | A1* | 12/2015 | Yasui | G02B 5/3025 428/337 |
| 2015/0369972 | A1* | 12/2015 | Asaoka | G02F 1/1335 359/599 |
| 2015/0378069 | A1* | 12/2015 | Yamamoto | B32B 7/02 359/361 |
| 2016/0139454 | A1* | 5/2016 | Katsuta | G02B 5/0242 359/599 |
| 2016/0202541 | A1* | 7/2016 | Asaoka | G02B 5/0226 359/599 |
| 2016/0209552 | A1* | 7/2016 | Satake | B32B 7/02 |
| 2016/0285049 | A1* | 9/2016 | Song | H01L 27/3283 |
| 2016/0291218 | A1* | 10/2016 | Asaoka | G02B 5/0236 |

FOREIGN PATENT DOCUMENTS

| | | |
|---|---|---|
| CN | 101158778 A | 4/2008 |
| JP | 2012098751 A | 5/2012 |

\* cited by examiner

OPTICAL ASSEMBLY AND MANUFACTURING METHOD THEREOF, AND POLARIZER

CROSS-REFERENCE TO RELATED APPLICATION

The present application claims priority to Chinese Patent Application No. 201510254982.1 filed on May 19, 2015, which is incorporated herein by reference in its entirety.

FIELD

The present disclosure relates to the field of display technology, and in particular, to an optical assembly and a manufacturing method thereof, and a polarizer.

BACKGROUND

Gray scale inversion phenomenon may often occur when a liquid crystal panel is observed at a large viewing angle or a low viewing angle, in view of this, wide viewing angle displays are developed. In related technology, with respect to most wide viewing angle displays, a wide viewing angle film layer for alleviating a side-viewing gray scale inversion is coated on a surface of a liquid crystal panel, this wide viewing angle film layer has multiple light absorption patterns. A number of semi-conical holes is disposed in a film layer at a side of the light absorption patterns. Front-viewing lights emitted from a liquid crystal display (LCD) can be totally reflected by transparent photo-resist interfaces of the holes, and are turned, through reflection, into side-viewing lights without gray scale inversion effect. Most side viewing lights having gray scale inversion effect directly emitted from the LCD are obscured by the light absorption patterns and thus cannot be observed. Therefore, the viewing angle characteristic of the LCD is improved. However, the front-viewing lights emitted from the LCD may be obscured by the light absorption patterns, which results in decrease of brightness of the LCD.

SUMMARY

In view of this, it is provided an optical assembly and a manufacturing method thereof, and a polarizer in the present disclosure, thereby enlarging a viewing angle as well as enhancing display brightness.

In one aspect, an optical assembly is provided in the present disclosure. The optical assembly includes: a first film layer; a second film layer disposed opposite to the first film layer; and multiple light absorption patterns disposed on the first film layer. The first film layer and the second film layer are light transmissive film layers. Holes are disposed in the second film layer at locations corresponding to the light absorption patterns and a dimension of an end of each hole away from the light absorption pattern is smaller than a dimension of an end of the hole close to the light absorption pattern. The optical assembly further includes light transmissive protrusions protruding into the holes.

Optionally, the optical assembly may further include a third film layer, where the third film layer and the second film layer may be located at an identical side of the first film layer, and the light transmissive protrusions may be disposed on the third film layer.

Optionally, the light absorption patterns and the second film layer may be located at an identical side of the first film layer.

Optionally, the light transmissive protrusions may be conical, hemispheroidal or are portions of ellipsoids.

Optionally, the first film layer may be a polyester film.

Optionally, the second film layer may be a transparent photoresist layer.

Optionally, the transparent photoresist layer may be a negative transparent photoresist layer.

Optionally, the third film layer may be an optically clear adhesive (OCA) layer.

Optionally, a thickness of the OCA layer may range from 18 μm to 25 μm.

Optionally, the light absorption patterns and the second film layer may be each located at two sides of the first film layer respectively.

Optionally, each hole may be in shape of a truncated cone and an angle between a generatrix of the truncated cone and a bottom plane of the truncated cone may be not greater than 80 degrees.

In another aspect, a display device is provided in the present disclosure, and the display device includes a display panel and an optical assembly described above.

In another aspect, a polarizer is provided according to the present disclosure, and the polarizer includes: a protective film; a polarizing film; and an optical assembly provided in the present disclosure as described above.

In another aspect, a method for manufacturing an optical assembly is provided in the present disclosure, and the method includes: disposing a second film layer and light absorption patterns on a first film layer, where the first film layer and the second film layer are light transmissive film layers; and forming holes in the second film layer at locations corresponding to the light absorption patterns, where a dimension of an end of each hole away from the corresponding light absorption pattern is smaller than a dimension of an end of the hole close to the corresponding light absorption pattern. The method further includes: forming light transmissive protrusions, which protrude into the holes, at an end of the second film layer away from the first film layer.

Optionally, the step of forming light transmissive protrusions, which protrude into the holes, at an end of the second film layer away from the first film layer may include: coating a light transmissive material on the second film layer, where the light transmissive material is not fully shaped and is for forming a third film layer; pressing the light transmissive material for forming the third film layer with a preset pressure to make the light transmissive material for forming the third film layer protrude into the holes to form the light transmissive protrusions; and curing and fully shaping the light transmissive material for forming the third film layer.

Optionally, the step of disposing the light absorption patterns on the first film layer may include: forming, on the first film layer, black points as the light absorption patterns by means of printing or ink-jet printing.

As seen from the foregoing, according to the method for manufacturing an optical assembly provided in the present disclosure, the light transmissive protrusions protruding into the holes are disposed on an end of the second film layer away from the first film layer, such that, by means of providing the optical assembly, not only a viewing angle of a display assembly is enlarged, but also more front-viewing lights projected to the optical assembly can pass through the optical assembly, thereby improving light transmittance of the optical assembly. Moreover, with the method for manufacturing an optical assembly provided in the embodiments of the present disclosure, the light transmissive protrusions can be manufactured using simplified steps, and production efficiency of the optical assembly is improved.

DETAILED DESCRIPTION OF THE EMBODIMENTS

To further clarify technical solutions and advantages of the present disclosure, the present disclosure is detailed hereinafter in conjunction with drawings and specific embodiments.

Figure 1:
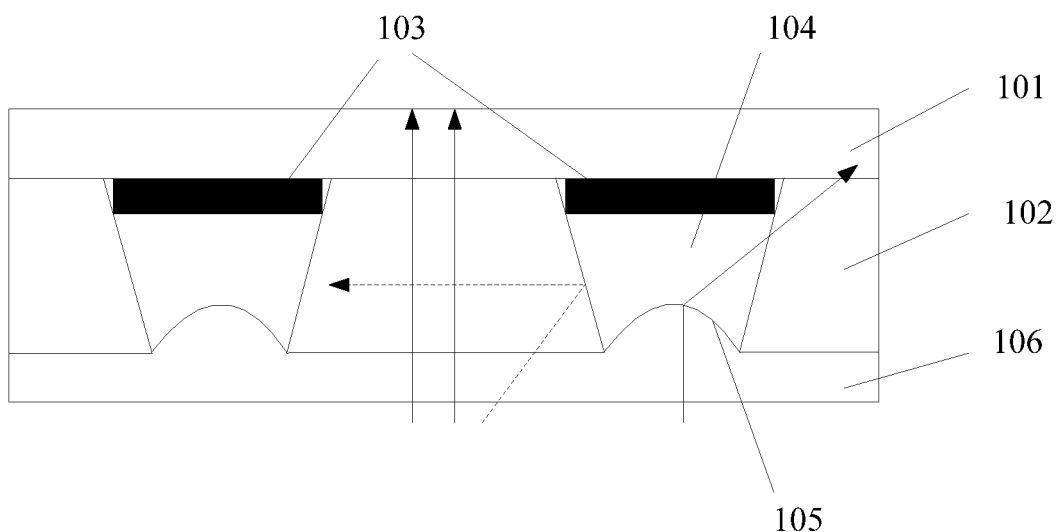
FIG. 1 is a schematic structural diagram of an optical assembly according to some embodiments of the present disclosure.

Firstly, an optical assembly is provided in the present disclosure, the structure of the optical assembly is shown in FIG. 1. The optical assembly includes: a first film layer 101; a second film layer 102 disposed opposite to the first film layer 101; and multiple light absorption patterns 103 disposed on the first film layer 101. The first film layer 101 and the second film layer 102 are light transmissive film layers. Holes 104 are disposed in the second film layer 102 at locations corresponding to the light absorption patterns 103, and a dimension of an end of each hole 104 away from the light absorption pattern 103 is smaller than a dimension of an end of the hole 104 close to the light absorption pattern 103. The optical assembly further includes light transmissive protrusions 105 protruding into the holes 104.

As seen from the foregoing description, with respect to the optical assembly provided in the present disclosure, multiple light absorption patterns 103 are disposed on the first film layer 101 and can obscure lights having gray scale inversion effect emitted from a backlight module, so as to alleviate gray scale inversion effect. A part of side-viewing lights without gray scale inversion effect emitted from the backlight module is reflected by side walls of the holes 104, and this part of side-viewing lights can be observed when a user looks at a display device having this optical assembly at a large viewing angle, thus images observed by the user at large viewing angles are essentially the same as an image observed by the user directly facing the display device; hence, the viewing angle of the display device is enlarged and display effect is improved. Further, in the optical assembly provided in the present disclosure, front-viewing lights are refracted by the light transmissive protrusions 105 protruding into the holes 104 and then emitted from portions of the optical assembly other than the light absorption patterns 103, rather than been obscured by the light absorption patterns 103; thus, more front-viewing lights without gray scale inversion effect can be observed by the user, and display brightness of the display device is enhanced.

In a specific embodiment of the present disclosure, the light absorption patterns 103 may be light shielding points, for example, black light shielding points.

In a specific embodiment, the holes 104 are in shape of truncated cones.

In a specific embodiment, the light transmissive protrusions 105 may be of any shape, with which the front-viewing lights without gray scale inversion effect can be refracted and the refracted lights can be emitted from portions of the optical assembly other than the light absorption patterns 103.

In FIG. 1, lights without gray scale inversion effect are indicated by solid arrows and lights having gray scale inversion effect are indicated by dotted arrows. As can be seen, front viewing lights, which are to be obscured by the light absorption patterns 103 in a case that no light transmissive protrusion 105 is disposed, can be refracted by the light transmissive protrusions 105, and the refracted front viewing lights are emitted from peripheries of the light absorption patterns 103 rather than being obscured by the light absorption patterns 103. Lights without gray scale inversion effect are reflected at side walls of the holes 104. Therefore, transmittance of the front viewing lights is improved meanwhile gray scale inversion effect is alleviated, such that a display panel or other similar device having this optical assembly has high brightness. It has been proved by practical tests that, with the arrangement of the light transmissive protrusions 105, less than 10% of the front viewing lights are obscured, whereas, in a case that the light transmissive protrusions 105 are not disposed and only the first film layer 101, the second film layer 102, the light absorption patterns 103 and the holes 104 are employed to enlarge a viewing angle of the display device, more that 20% of the front viewing lights are obscured.

In some embodiments of the present disclosure, the optical assembly further includes a third film layer 106. The third film layer 106 and the second film layer 102 are located at an identical side of the first film layer 101, and the light transmissive protrusions 105 are disposed on the third film layer 106.

In a specific embodiment, the third film layer 106 is a light transmissive film layer, and the light transmissive protrusions 105 are a part of the third film layer 106. Accordingly, the light transmissive protrusions 105 may be manufactured simultaneously while forming the third film layer 106. Specifically, the first film layer 101 and the second film layer 102 are firstly formed and shaped, a material for forming the third film layer 106 is coated on the second film layer, and a certain pressure is applied to the material for forming the third film layer 106 such that the unshaped material for forming the third film layer 106 is partially protruded into the holes 104 in the second film layer 102 to form the light transmissive protrusions 105.

In other embodiments, the light transmissive protrusions 105 may be protrusions provided separately, which belong to no film layer.

In some embodiments of the present disclosure, still as shown in FIG. 1, the light absorption patterns 103 and the second film layer 102 are located on an identical side of the first film layer 101. In this case, the light absorption patterns 103 can be clamped and protected by the first film layer 101 and the second film layer 102, such that the light absorption patterns are prevented from falling off.

In other embodiments, alternatively, the light absorption patterns and the second film layer are located at two sides of the first film layer respectively.

In some embodiments of the present disclosure, the light transmissive protrusions are conical, hemispheroidal or are portions of ellipsoids.

In some embodiments of the present disclosure, the first film layer is a polyester film, for example, a Polyethylene terephthalate (PET) film.

In some embodiments of the present disclosure, the second film layer is a transparent photoresist layer.

More specifically, the transparent photoresist layer is a negative transparent photoresist layer.

In some embodiments of the present disclosure, the third film layer is an optically clear adhesive (OCA) layer.

In some specific embodiments of the present disclosure, a thickness of the OCA layer ranges from 18 μm to 25 μm.

In use, the optical assembly may be attached onto a display device, for example, onto a display panel. Lights emitted by a backlight module and reaching the third film layer may be emitted out directly at locations where no light transmissive protrusion is arranged. At locations where the light transmissive protrusions are arranged, front-viewing lights are refracted by the light transmissive protrusions and the refracted lights are emitted out from peripheries of the light absorption patterns, thus, brightness of front-viewing lights without gray scale inversion effect emitted from the display panel is increased; lights having gray scale inversion effect are obscured or absorbed by the light absorption patterns, thus, the lights having gray scale inversion effect cannot be observed by a user using the display panel, and a viewing angle of the display panel can be enlarged while brightness of the front-viewing lights is increased.

In specific embodiments of the present disclosure, the optical assembly may be applied to various display devices, for improving gray scale inversion phenomenon of the display devices. The display devices include display panels or may be any electronic devices having display panels.

Figure 2:
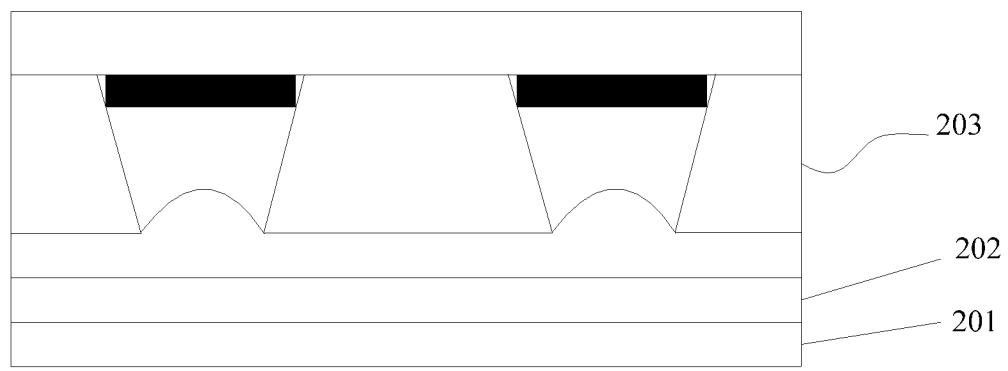
FIG. 2 is a schematic structural diagram of a polarizer according to some embodiments of the present disclosure.

Further, a polarizer is provided in the present disclosure, the structure of the polarizer is shown in FIG. 2, and from bottom to top in FIG. 2, the polarizer sequentially includes: a protective film 201; a polarizing film 202; and an optical assembly 203 according to above embodiments of the present disclosure.

In a specific embodiment of the present disclosure, the protective film 201 and the optical assembly 203 are disposed on two sides of the polarizing film 202 respectively, and both of the protective film 201 and the optical assembly 203 can protect the polarizing film 202. In a specific embodiment, the protective film 201 is a triacetyl cellulose (TCA) film. In a specific embodiment, the polarizing film 202 is a polyvinyl alcohol (PVA) film.

In related technologies, a polarizer includes a polarizing film and two layers of TAC film, the polarizing film is sandwiched between the two layers of TAC film so as to be protected. While with the polarizer provided in the present disclosure, one layer of the two TAC films in the related technologies is replaced by the optical assembly according to the embodiments of the present disclosure, such that not only the gray scale inversion phenomenon of lights passing through the polarizer is reduced, but also the quantity of TAC films of high price is saved; hence, total cost is significantly reduced by using the polarizer provided in the present disclosure.

Further, a display device is provided in the present disclosure. The display device includes a display panel and an optical assembly according to embodiments of the present disclosure.

Further, a method for manufacturing an optical assembly is provided in the present disclosure. The method includes: disposing a second film layer and light absorption patterns on a first film layer, where the first film layer and the second film layer are light transmissive film layers; and forming holes in the second film layer at locations corresponding to the light absorption patterns, where a dimension of an end of each hole away from the light absorption pattern is smaller than a dimension of an end of the hole close to the light absorption pattern. The method further includes: forming light transmissive protrusions, which protrude into the holes, at an end of the second film layer away from the first film layer.

In some embodiments of the present disclosure, specifically, the step of disposing the light transmissive protrusions, which protrude into the holes, at the end of the second film layer away from the first film layer includes: coating a light transmissive material on the second film layer, the light transmissive material is not fully shaped and is for forming a third film layer; pressing the light transmissive material for forming the third film layer with a set pressure to make the light transmissive material for forming the third film layer protrude into the holes to form the light transmissive protrusions; and curing and fully shaping the light transmissive material for forming the third film layer.

Figure 3A:
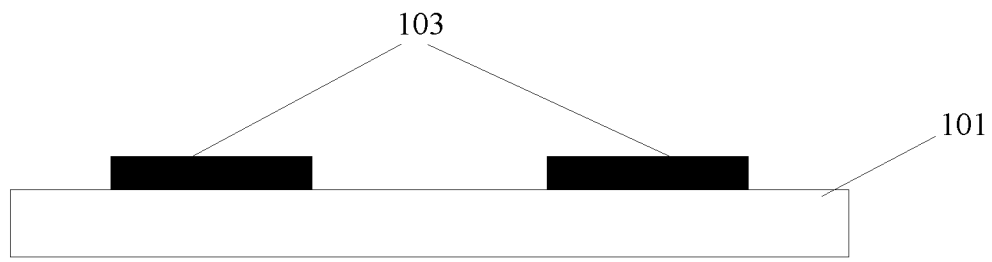
FIGS. 3A-3D are schematic diagrams of a manufacturing procedure of an optical assembly according to some embodiments of the present disclosure.
Figure 3B:
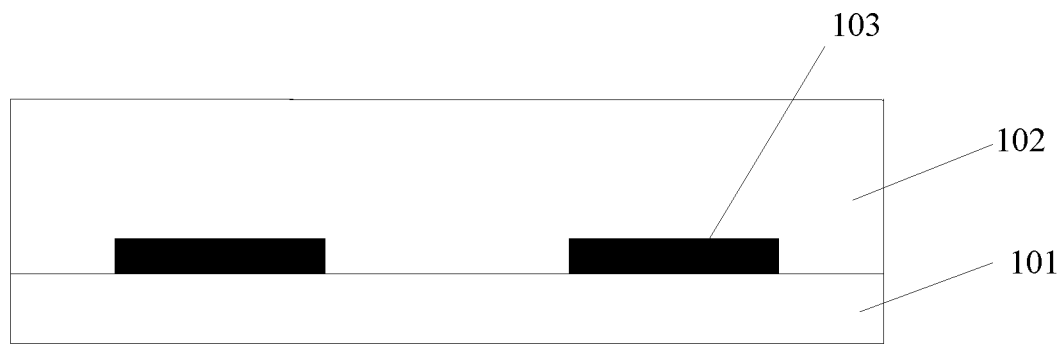
Figure 3C:
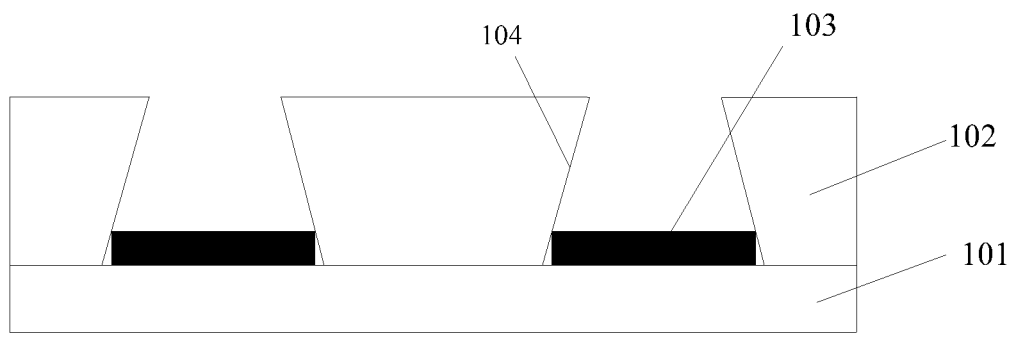
Figure 3D:
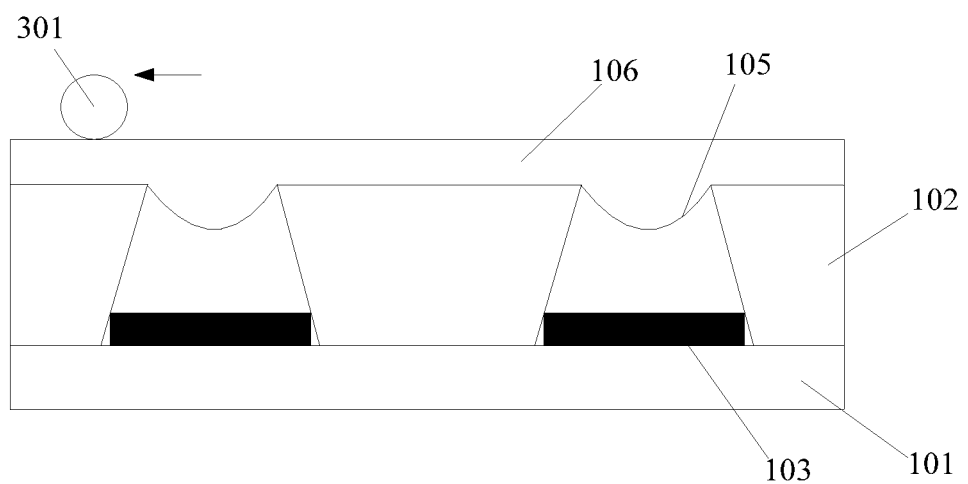

According to the present disclosure, a method for manufacturing an optical assembly is shown in FIGS. 3A-3D. In a specific embodiment of the present disclosure, the first film layer 101 is a polyester film, and the second film layer 102 is a transparent photoresist layer. During manufacturing of the optical assembly, as shown in FIG. 3A, black points are formed on the first film layer 101 by means of printing or ink-jet printing and serve as the light absorption patterns 103; as shown in FIG. 3B, the second film layer 102 is coated on one side, where the black points are formed, of the first film layer 101. Ultraviolet light is projected from another side of the first film layer 101 to the side of the first film layer 101 on which the black points are formed, to expose the second film layer 102. The ultraviolet light passes through the first film layer 101 and a part of the second film layer 102, and the part of the second film layer 102 which is illuminated by the ultraviolet light is cured. The black points act as masks, and the other part of the second film layer 102 is not cured due to the obscuration of the black points and can be removed through cleaning. As shown in FIG. 3C, based on characteristic of direct light, holes 104 in shape of truncated cone are formed at portions obscured by the black points, and locations of the holes 104 correspond to locations of the black points. An OCA film serving as a third film layer 106 is coated on the second film layer 102 which is already cured. As shown in FIG. 3D, before the OCA is cured and shaped, the OCA film is pressed using a pressing mechanism such as a roller 301, such that the OCA can enter into the holes 104 at locations corresponding to the holes 104 and light transmissive protrusions 105 are formed, where a direction indicated by an arrow in FIG. 3D is a direction in which the roller 301 rolls.

A polarizer including an optical assembly provided in the present disclosure can be manufactured in a following procedure: manufacturing a first film layer, light absorption patterns and a second film layer having holes, where locations of the light absorption patterns correspond to locations of the holes; coating an OCA layer on a side of the second film layer away from the light absorption patterns, where a thickness of the OCA layer ranges from 18 μm to 25 μm; pressing the OCA layer using a roller, such that the OCA layer which is not fully cured protrudes into the holes of the second film layer to form light transmissive protrusions, where the depth of the OCA layer protruding into the holes can be varied through controlling a pressure of the roller; coating a PVA film at a side of the OCA layer and coating a TAC film at a side of the PVA film; and pressing the TAC film using a roller, such that the TAC film is tightly attached to the PVA film.

In a preferred embodiment of the present disclosure, in a case that the hole of the second film layer is in shape of a truncated cone, a longitudinal section of the hole is an isosceles trapezium, and an angle between a generatrix of the truncated cone, i.e., a lateral side of the isosceles trapezium, and a bottom plane of the truncated cone is not greater than 80 degrees.

In a specific embodiment of the present disclosure, the light absorption patterns can be distributed randomly on the first film layer by means of printing or ink-jet printing. After the light absorption patterns are formed, the second film layer is coated on the first film layer, and holes in the second film layer are formed using the light absorption patterns, and then the light transmissive protrusions are formed using the holes.

In other embodiments of the present disclosure, the light transmissive protrusions are conical, hemispheroidal or are portions of ellipsoids. In a case that the light transmissive protrusions are a part of the third film layer, different shapes of the light transmissive protrusions can be achieved with different materials for forming the third film layer.

As seen from the foregoing, according to the method for manufacturing an optical assembly provided in the present disclosure, the light transmissive protrusions protruding into the holes are disposed on an end of the second film layer away from the first film layer, such that, by means of providing the optical assembly, not only a viewing angle of a display assembly is enlarged, but also more front-viewing lights projected to the optical assembly can pass through the optical assembly, thereby improving light transmittance of the optical assembly. Moreover, with the method for manufacturing an optical assembly provided in the embodiments of the present disclosure, the light transmissive protrusions can be manufactured using simplified steps, and production efficiency of the optical assembly is improved.

It should be understood that, various embodiments described in the specification are only intended to illustrate and explain the present disclosure, but are not intended to limit the present disclosure. The embodiments and characteristics of the embodiments may be combined with each other if no conflict is to be caused by the combination.

It is obvious to those skilled in the art that various modifications to and variations of the present disclosure can be made without departing from the spirit and scope of the present disclosure. Thus, provided that such modifications to and variations of the present disclosure fall within the scope of the appended claims and their equivalents of the present disclosure, the present disclosure also intends to contain those modifications and variations.

What is claimed is:

1. An optical assembly, comprising:
a first film layer;
a second film layer disposed opposite to the first film layer; and
a plurality of light absorption patterns disposed on the first film layer;
wherein the first film layer and the second film layer are light transmissive film layers, holes are disposed in the second film layer at locations corresponding to the plurality of light absorption patterns, and a dimension of an end of each hole away from the corresponding light absorption pattern is smaller than a dimension of an end of the hole close to the corresponding light absorption pattern; and
wherein the optical assembly further comprises light transmissive protrusions protruding into the holes.

2. The optical assembly according to claim 1, further comprising:
a third film layer, wherein the third film layer and the second film layer are located at an identical side of the first film layer, and the light transmissive protrusions are disposed on the third film layer.

3. The optical assembly according to claim 1, wherein the light absorption patterns and the second film layer are located at an identical side of the first film layer.

4. The optical assembly according to claim 1, wherein the light transmissive protrusions are conical, hemispheroidal or are portions of ellipsoids.

5. The optical assembly according to claim 1, wherein the first film layer is a polyester film.

6. The optical assembly according to claim 1, wherein the second film layer is a transparent photoresist layer.

7. The optical assembly according to claim 6, wherein the transparent photoresist layer is a negative transparent photoresist layer.

8. The optical assembly according to claim 1, wherein the third film layer is an optically clear adhesive (OCA) layer.

9. The optical assembly according to claim 8, wherein a thickness of the OCA layer ranges from 18 μm to 25 μm.

10. The optical assembly according to claim 1, wherein the light absorption patterns and the second film layer are located at two sides of the first film layer respectively.

11. The optical assembly according to claim 1, wherein each hole is in shape of a truncated cone and an angle between a generatrix of the truncated cone and a bottom plane of the truncated cone is not greater than 80 degrees.

12. A display device, comprising a display panel and the optical assembly according to claim 1.

13. A polarizer, comprising:
a protective film;
a polarizing film; and
an optical assembly;
wherein the optical assembly comprises:
a first film layer; a second film layer disposed opposite to the first film layer; and a plurality of light absorption patterns disposed on the first film layer;
wherein the first film layer and the second film layer are light transmissive film layers, holes are disposed in the second film layer at locations corresponding to the light absorption patterns, a dimension of an end of each hole away from the corresponding light absorption pattern is smaller than a dimension of an end of the hole close to the corresponding light absorption pattern, and
wherein the optical assembly further comprises light transmissive protrusions protruding into the holes.

14. The polarizer according to claim 13, wherein the protective film is a triacetyl cellulose film.

15. The polarizer according to claim 13, wherein the polarizing film is a polyvinyl alcohol film.

16. A method for manufacturing an optical assembly, comprising:
disposing a second film layer and light absorption patterns on a first film layer, wherein the first film layer and the second film layer are light transmissive film layers; and
forming holes in the second film layer at locations corresponding to the light absorption patterns, wherein a dimension of an end of each hole away from the corresponding light absorption pattern is smaller than a dimension of an end of the hole close to the corresponding light absorption pattern;
wherein the method further comprises: forming light transmissive protrusions, which protrude into the holes, at an end of the second film layer away from the first film layer.

17. The method according to claim 16, wherein the step of forming light transmissive protrusions, which protrude into the holes, at an end of the second film layer away from the first film layer comprises:
- coating a light transmissive material on the second film layer, wherein the light transmissive material is not fully shaped and is for forming a third film layer;
- pressing the light transmissive material for forming the third film layer with a set pressure to make the light transmissive material for forming the third film layer protrude into the holes to form the light transmissive protrusions; and
- curing and fully shaping the light transmissive material for forming the third film layer.

18. The method according to claim 16, wherein the step of forming the light absorption patterns on the first film layer comprises:
- forming, on the first film layer, black points as the light absorption patterns by means of printing or ink-jet printing.

\* \* \* \* \*